R. B. RESPESS.
UNWOVEN FABRIC AND PROCESS OF MAKING THE SAME.
APPLICATION FILED MAR. 13, 1919.

1,365,061.

Patented Jan. 11, 1921.

Inventor
Roland B. Respess
By his Attorney
A. A. de Bonneville

UNITED STATES PATENT OFFICE.

ROLAND B. RESPESS, OF NEW YORK, N. Y.

UNWOVEN FABRIC AND PROCESS FOR MAKING THE SAME.

1,365,061. Specification of Letters Patent. Patented Jan. 11, 1921.

Application filed March 13, 1919. Serial No. 282,501.

*To all whom it may concern:*

Be it known that I, ROLAND B. RESPESS, a citizen of the United States, and a resident of the borough of Manhattan, in the county of New York and State of New York, have invented certain new and useful Improvements in Unwoven Fabrics and Processes for Making the Same, of which the following is a specification.

This invention relates to unwoven fabric and the process for making the same; particularly to the production of a fabric suitable for use in the manufacture of automobile tires.

In general terms my unwoven fabric is made by forming a continuous sheet of predetermined width from one continuous cord or thread by means of a rotating or revolving head and depositing it on a moving sheet to form overlapping circles or ovals of the cord as it is deposited on the sheet. My invention also relates to making a sheet, as above described, to which is attached a sheet of woven fabric or a sheet of rubber.

Figure 1:
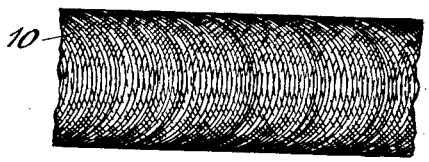
Figure 2:
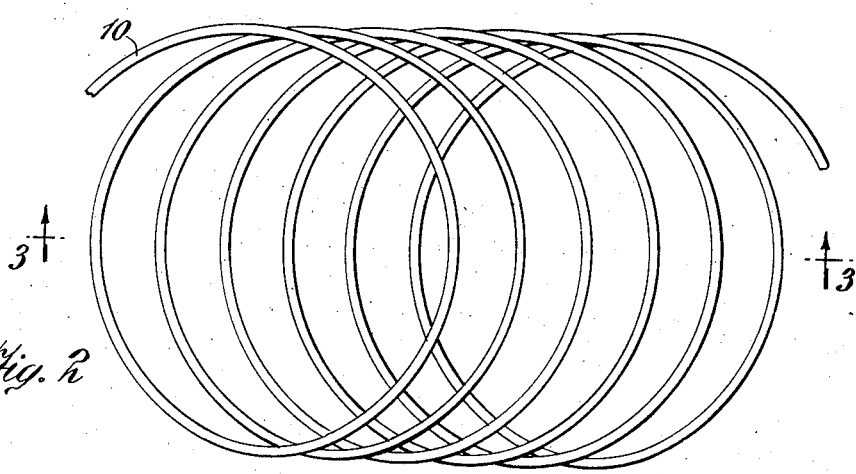
Figure 3:
Figure 4:
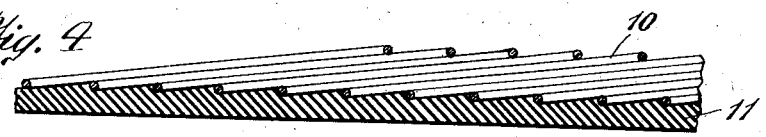
Figure 5:
Figure 6:
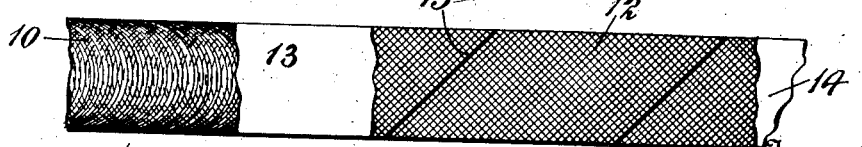

In the accompanying drawings Figure 1 shows a top plan view of my cord fabric without any backing; Fig. 2 shows an enlarged fragmentary portion of Fig. 1; Fig. 3 is a section of Fig. 2 on the line 3, 3; Fig. 4 shows an enlarged section similar to Fig. 3 with a backing of a thin sheet of rubber; Fig. 5 shows a section similar to Fig. 3 on a reduced scale with a rubberized sheet of woven fabric below the cords and Fig. 6 shows a top plan view of Fig. 5 with portions thereof broken away.

In the production of this fabric, see Figs. 1, 2 and 3, suitable cord or thread 10 is wound on a spool from which it is unwound and conveyed by guides into and through a tank containing rubber cement. As the cord 10 passes through the tank it is saturated with the rubber cement and becomes adhesive. The saturated cord 10 next passes through guides to a revolving head which deposits the adhesive cord 10 in a circular or generally circular or oval form on a moving belt. The belt advances slightly with each complete revolution of head, thus forming overlapping circles or ovals, which are held in position by the adhesive coating of rubber cement on the cord.

This fabric may be deposited on a continuous belt which subsequently passes through a drying chamber, where the solvent in the rubber cement is evaporated. The fabric may then be stripped from the belt and passed between pressure rolls to cause the cords to adhere more firmly to each other.

The cord 10 may also be deposited, see Fig. 4, on a thin sheet of un-vulcanized rubber 11 passing under the revolving head, then delivered to a drying chamber where the solvent of the cement is evaporated, after which the fabric may be passed between rolls and the rubber sheet pressed into the cord sheet. A two-ply sheet, see Figs. 5 and 6, of woven fabric 12 and the cord fabric 10 combined may also be constructed by rubberizing the woven fabric 12 on a calender press, as shown at 13 and 14 Fig. 5, cutting the rubberized fabric at angles to the lengthwise of the sheet, joining the selvage ends 15 together to make a continuous sheet and depositing the cords 10 on this prepared woven fabric, after which it is dried and pressed.

Having described my invention, what I desire to secure by Letters Patent and claim is:

1. The herein described process of making an unwoven fabric consisting in forming a matted cord sheet of overlapping circles or ovals, by coating cords or threads with a compound of rubber containing vulcanizing agents, depositing the cords or threads on a moving belt in overlapping circular or oval form of predetermined design, evaporating the solvent of the compound and pressing the product.

2. The herein described process of making an unwoven fabric consisting in coating cords or threads with a compound of rubber containing vulcanizing agents, depositing the cords or threads on a moving sheet of rubber in overlapping circular or oval form of predetermined design, evaporating the solvent of the compound and pressing the product.

3. The herein described process of making a two ply fabric consisting in coating cords or threads with a compound of rubber containing vulcanizing agents, depositing the cords or threads on a moving sheet of woven cloth in overlapping circular or oval form of predetermined design, evaporating the solvent of the compound and pressing the product.

4. An unwoven fabric comprising cords or threads forming overlapping circles or ovals, rubber cement coating and binding the cords or threads together and a vulcanizing agent for the product.

5. An unwoven fabric comprising cords or threads forming overlapping circles or ovals, rubber cement coating and binding the cords or threads together, a sheet of rubber attached to the cords and a vulcanizing agent for the product.

6. A two ply fabric comprising cords or threads forming overlapping circles or ovals, rubber cement coating and binding the cords or threads together, a sheet of woven fabric attached to the cords or threads and a vulcanizing agent for the product.

Signed at the borough of Manhattan in the county of New York and State of New York this 10th day of March, A. D. 1919.

ROLAND B. RESPESS.